US012756273B2

(12) United States Patent
Onishi et al.

(10) Patent No.: US 12,756,273 B2
(45) Date of Patent: Oct. 6, 2026

(54) ROTATING ELECTRICAL MACHINE

(71) Applicant: Mitsubishi Electric Corporation, Tokyo (JP)

(72) Inventors: Yoshihiko Onishi, Tokyo (JP); Isao Sonoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 374 days.

(21) Appl. No.: 18/039,533

(22) PCT Filed: Apr. 26, 2021

(86) PCT No.: PCT/JP2021/016597
§ 371 (c)(1),
(2) Date: May 31, 2023

(87) PCT Pub. No.: WO2022/230007
PCT Pub. Date: Nov. 3, 2022

(65) Prior Publication Data

US 2024/0006963 A1 Jan. 4, 2024

(51) Int. Cl.
*H02K 9/22* (2006.01)
*H02K 11/33* (2016.01)

(52) U.S. Cl.
CPC ............. *H02K 9/227* (2021.01); *H02K 11/33* (2016.01); *H02K 2211/03* (2013.01)

(58) Field of Classification Search
CPC ........ H02K 9/227; H02K 11/30; H02K 11/33; H02K 11/38
See application file for complete search history.

(56) References Cited

U.S. PATENT DOCUMENTS

2015/0189733 A1* 7/2015 Shibata ................ H05K 1/0204 361/705
2019/0115806 A1* 4/2019 Yamashita ............. H02K 7/083
2019/0276072 A1* 9/2019 Morimoto ................ H01G 9/06
2019/0379258 A1* 12/2019 Hon ....................... H05K 7/209
2022/0104340 A1 3/2022 Moriyama

FOREIGN PATENT DOCUMENTS

DE 102018004358 A1 * 12/2019 ........... H02K 11/215
JP 2015-126098 A 7/2015
JP 2017-229124 A 12/2017
JP 2018-174226 A 11/2018
JP 2020-113562 A 7/2020
(Continued)

OTHER PUBLICATIONS

18039533_2025-04-11_WO_2019064767_A1_H.pdf (Year: 2025).*
(Continued)

*Primary Examiner* — Christopher M Koehler
*Assistant Examiner* — Ahmed F Seck
(74) *Attorney, Agent, or Firm* — Sughrue Mion, PLLC

(57) ABSTRACT

A rotating electrical machine that includes a heat dissipating structure of a heat generating portion of a control board includes the control board that includes a heating element on top of a main surface, a heat sink disposed so as to oppose the main surface, and includes a recess that accommodates the heating element on an opposite surface that oppose the main surface, and a heat dissipating material formed in a gap between the heating element and the recess.

6 Claims, 9 Drawing Sheets

(56) References Cited

FOREIGN PATENT DOCUMENTS

| | | | | | |
|---|---|---|---|---|---|
| JP | 2021-44984 | A | | 3/2021 | |
| WO | 2017/169990 | A1 | | 10/2017 | |
| WO | 2019/064897 | A1 | | 4/2019 | |
| WO | 2019/064899 | A1 | | 4/2019 | |
| WO | WO-2019064767 | A1 | * | 4/2019 | ........... B62D 5/0406 |

OTHER PUBLICATIONS

18039533_2025-08-26_DE_102018004358_A1_H.pdf (Year: 2025).*

Japanese Office Action issued Jan. 30, 2024 in Application No. 2023-516864.

Extended European Search Report issued May 23, 2024 in European Application No. 21939171.1.

International Search Report of PCT/JP2021/016597 dated Jun. 8, 2021 [PCT/ISA/210].

Chinese Office Action dated May 12, 2026, issued in Chinese application No. 202180090224.4.

* cited by examiner

ROTATING ELECTRICAL MACHINE

CROSS REFERENCE TO RELATED APPLICATIONS

This application is a National Stage of International Application No. PCT/JP2021/016597 filed on Apr. 26, 2021.

TECHNICAL FIELD

The present disclosure relates to a rotating electrical machine.

BACKGROUND ART

In conventional rotating electrical machines (for example, an engine or the like), a structure to dissipate heat to a heat sink through a heat dissipating material is provided to dissipate heat of a heating element (for example, a switching element or the like) of a control board. In such a structure, the control board, is screw-fixed to a motor configuration component such as a housing or the like, and typically has a control circuit component and a power circuit component that are mounted together. The heat dissipating material is provided in the power circuit component, and heat dissipation from a top surface of the power circuit component to the heat sink is assured (Refer to Patent Documents 1 and 2).

CITATION LIST

Patent Document

[Patent Document 1]
PCT International Publication No. WO 2019/064899 A1
[Patent Document 2]
Japanese Unexamined Patent Application, First Publication No. 2015-126098

SUMMARY OF INVENTION

Problem to be Solved by the Invention

In Patent Document 1, heat generated at the heating element on an inside of the power circuit is dissipated from a heat sink top surface through a heat dissipating grease from a top surface of the heating element. Heat transferred to an inside of the control board is dissipated to a bottom surface heat sink through the heat dissipating grease from a back surface of the control board. In this case, a heat dissipating surface area of a heating element top surface that is especially effective in dissipating heat of the heating element is small, and a heat dissipation amount to the heat sink in a case where a heat generation amount of the heating element increases during high output or the like is not enough.

In Patent Document 2, by forming a recess which corresponds to a shape of the heating element in the heat sink, a structure that improves beat dissipation performance where both a top surface and a side surface of the heating element act as heat dissipating surfaces is described. In this case, when setting a gap between the side surface of the heating element and the recess of the heat sink, consideration of variations in widths of heating elements, mounting positions with respect to the control board, distances between the heating elements, and an assembly position or the like with respect to the heat sink need to be considered. For this reason, as a number of the heating elements increases, the gap between the side surfaces needs to be widened, and the heat dissipation performance decreases.

The present disclosure has been made in order to address the problems above, and provides a rotating electrical machine where it is possible to expand the heat dissipating surface area with respect to the heat sink of the heating element while improving the heat dissipation performance.

Means to Solve the Problem

A rotating electrical machine according to an aspect of the present disclosure includes a heat dissipating structure of a heat generating portion of a control board, wherein the rotating electrical machine includes the control board that includes a heating element on top of a main surface, a heat sink having a recess that accommodates the heating element on a surface opposite to the main surface, where the heat sink having a recess is disposed so as to oppose the main surface, and a heat dissipating material formed in a gap between the heating element and the recess.

Effects of the Invention

According to the present disclosure, it is possible to provide a rotating electrical machine where a heat dissipating surface area with respect to a heat sink of a heating element is expanded.

DESCRIPTION OF EMBODIMENTS

Figure 1:
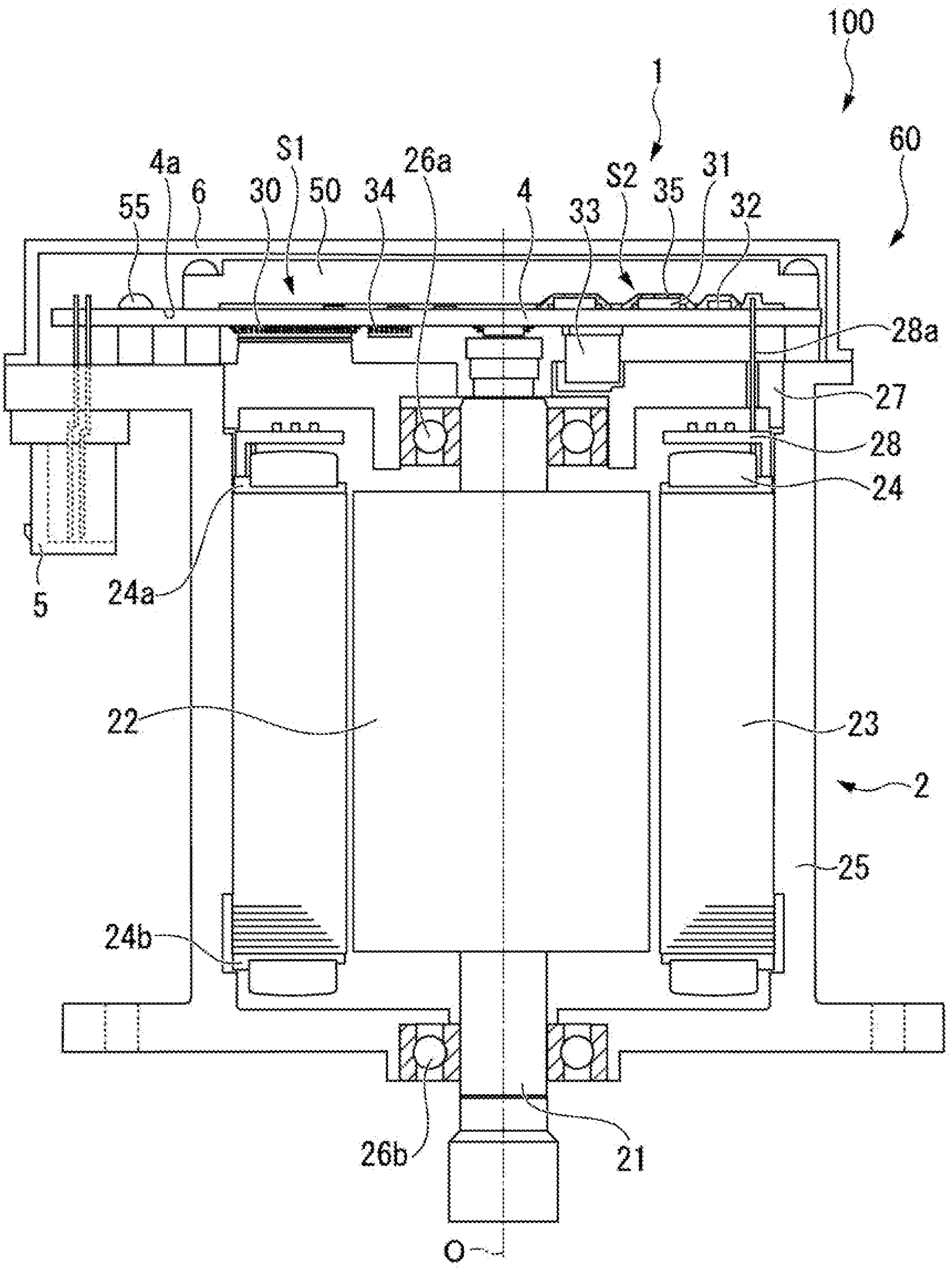
FIG. 1 is a schematic cross-sectional view of a rotating electrical machine according to a present embodiment.

FIG. 1 is a schematic cross-sectional view of a rotating electrical machine 100 according to a present embodiment, taken orthogonally with respect to an axial direction. As the rotating electrical machine, an inner most electric generator, or an electric motor or the like may be mentioned. In the present embodiment, explanations are carried out using the electric motor as an example.

In the present embodiment, an axial direction along an axis center O of the rotating electrical machine 100 is referred to as the “axial direction”. Across-section orthogonal to the axial direction is referred to as a “cross-section”. The rotating electrical machine 100 includes a control unit 1 and a multi-phase winding motor 2.

The control unit 1 includes a control board 4 to mount a control circuit portion S1 and a power circuit portion S2, a connector 5 disposed to connect to an edge of the control board 4, a heat sink 50 connected to the control board 4, and a cover 6 that contains the control board 4 and the heat sink 50.

A plurality of electronic components of the control circuit portion S1 and the power circuit portion S2 are mounted on a main surface 4*a* above the control board 4 in the axial direction. As the control board 4, a typical glass epoxy circuit board suffices, and the circuit board 4 is about 1 to 2 mm thickness in the present embodiment. In the control circuit portion S1, a CPU 30 and an IC 34 or the like are mounted. In the power circuit portion S2, a switching element (heating element) 31, a shunt resistor (heating element) 32, a capacitor 33, and a choke coil (not shown) or the like are mounted. In the present embodiment, the switching element 31 and the shunt resistor 32 of the power circuit portion S2 may both be described as the heating element henceforth, and both are covered by a heat dissipating material 35. Heat generated by the power circuit portion S2 is dissipated to the heat sink 50 to be mentioned later on through a heat dissipating material 35. From the heat dissipating material 35, it is possible to insure a wider surface area needed for dissipating heat, efficiently and stably dissipating heat to the heat sink 50.

The control board 4 is fixed to a case (accommodating portion) 25 of the motor 2 mentioned later on, or a housing 27 by a plurality of screws 55. Power and information input from the connector 5 pass through a terminal, and are supplied to each of the control circuit portion S1 and the power circuit portion S2. The motor 2 is mainly configured from a rotational (output) shaft 21 having the axis center O, a rotor 22, a stator 23, a case 25, and the housing 27. A plurality of permanent magnets not shown are disposed in a periphery of the rotor 22. A multiphase winding 24 that is wound around a bobbin 24*a*, 24*b* is disposed in the stator 23. A terminal portion 28*a* extending front an end of the winding 24 stretches above in the axial direction, and connects to the power circuit portion S2 of the control board 4 through a hole of the housing 27. Front this, power is supplied to the winding 24, and the output shaft 21 rotates.

The heat sink 50 is formed of a material with high thermal conductivity, such as aluminum or the like. For this reason, a gap is provided between the heat sink 50 and the heating element so as to maintain insulative properties. The heat dissipating material 35 is provided in the gap, and heat generated at the heating element is dissipated to the heat sink 50. To improve heat dissipation performance the gap needs to be made smaller, or a heat dissipating surface area needs to be expanded.

Figure 2:
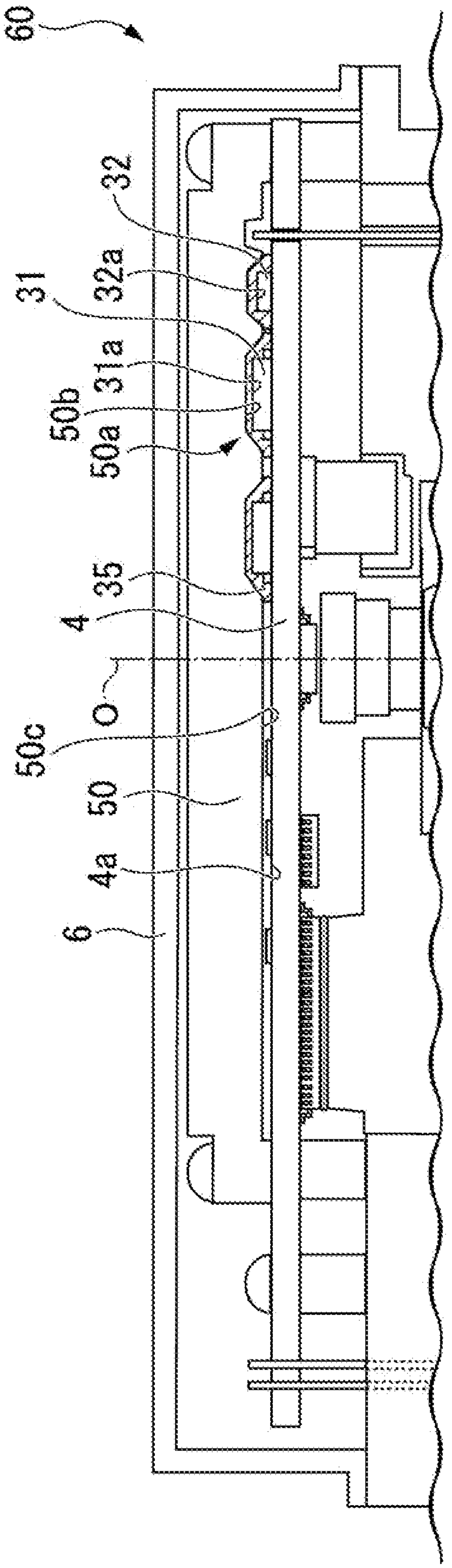
FIG. 2 is a cross-sectional view of a heat dissipating structure according to the present embodiment.

FIG. 2 shows a cross-sectional view of a heat dissipating structure 60 of the present embodiment. A recess 50*a* of a truncated cone that covers the heating element is provided on a surface of the heat sink 50 opposite to the heating element. In this situation, a first gap is provided between a flat surface (bottom surface) 50*b* of the recess 50*a* of the truncated cone, and a top surface of the heating element (in other words, a top surface 31*a* of the switching element 31 and a top surface 32*a* of the shunt resistor 32). A second gap is provided between a flat surface 50*c* where the recess 50*a* of the truncated cone of the heat sink 50 is not formed, and the control board 4 or a top surface of the mounted parts of the heating element of the power circuit portion S2. Here, a height (distance) of the first gap is larger than a height (distance) of the second gap.

From this, it is possible to expand the heat dissipating surface area, and to improve the heat dissipation performance to the heat sink 50. However, the present embodiment is concerned with improving the heat dissipation performance from the heating element to the heat sink 50, and regarding a temperature gradient of the heating element, a thickness of the heat sink 50 needs to be adjusted according to a heat generation amount.

In each of FIG. 3A to FIG. 3D, an example of an assembly step of the heat sink 50 of the present embodiment is shown.

Figure 3A:
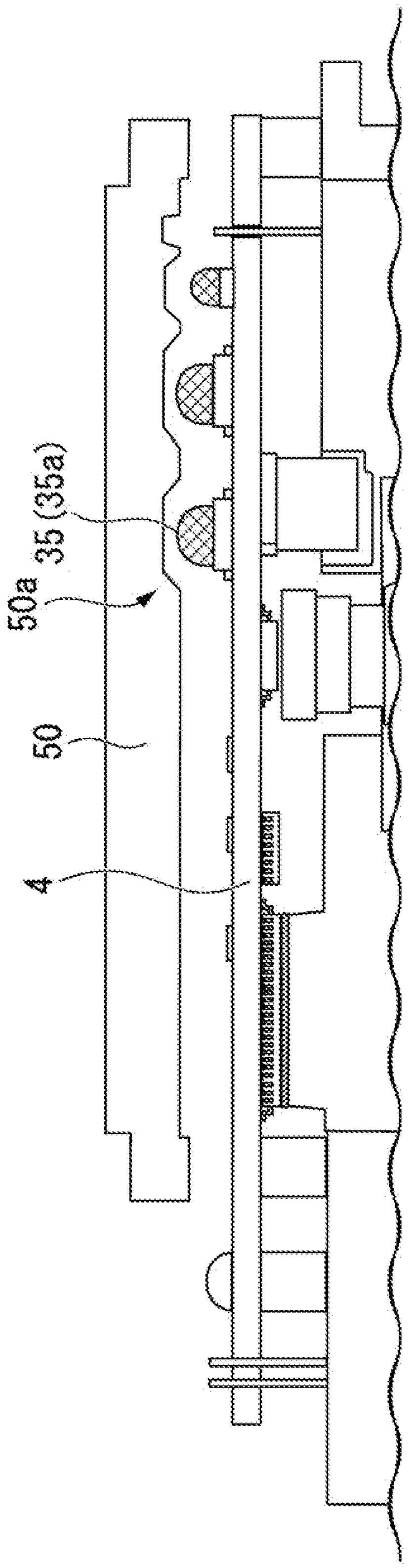
FIG. 3A is a view of a heat sink assembly step (application of a heat dissipating material) according to the present embodiment.
Figure 3B:
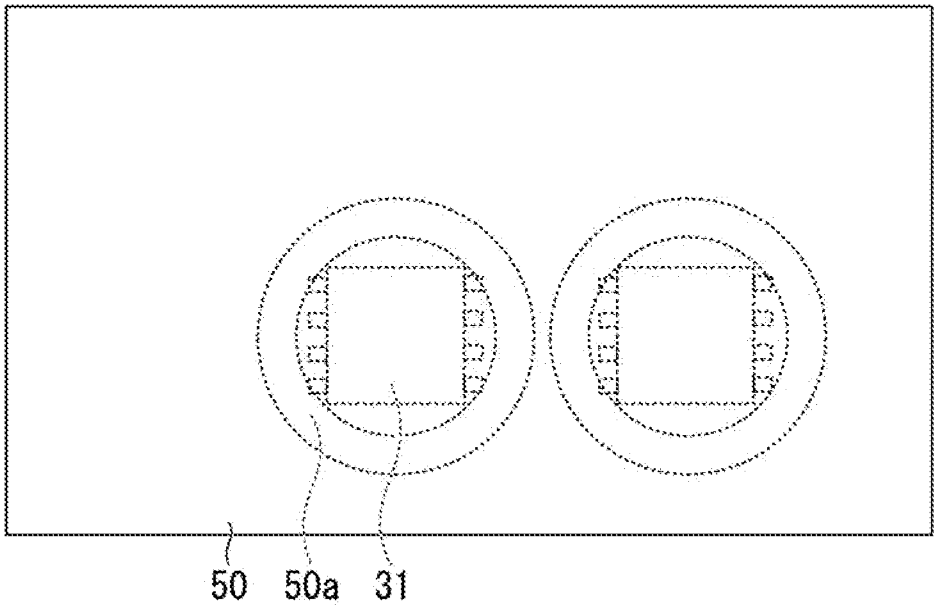
FIG. 3B is a top surface transparent view of a region of a heating element of the heat sink according to the present embodiment.

As shown in FIG. 3A, as an example of the heat dissipating material 35, a heat dissipating grease 35*a* having fluid properties is used, where a predetermined amount is applied to a vicinity of a center of the top surface of the heating element. Next, as shown in a top view of FIG. 3B, the recess 50*a* of the truncated cone of the heat sink 50 is positioned with respect to the heating element (here, an example of the switching element 31 is shown. Regarding the positioning, for example, an assembly reference hole or the like may be provided on the control board 4 and the heat sink 50.

Figure 3C:
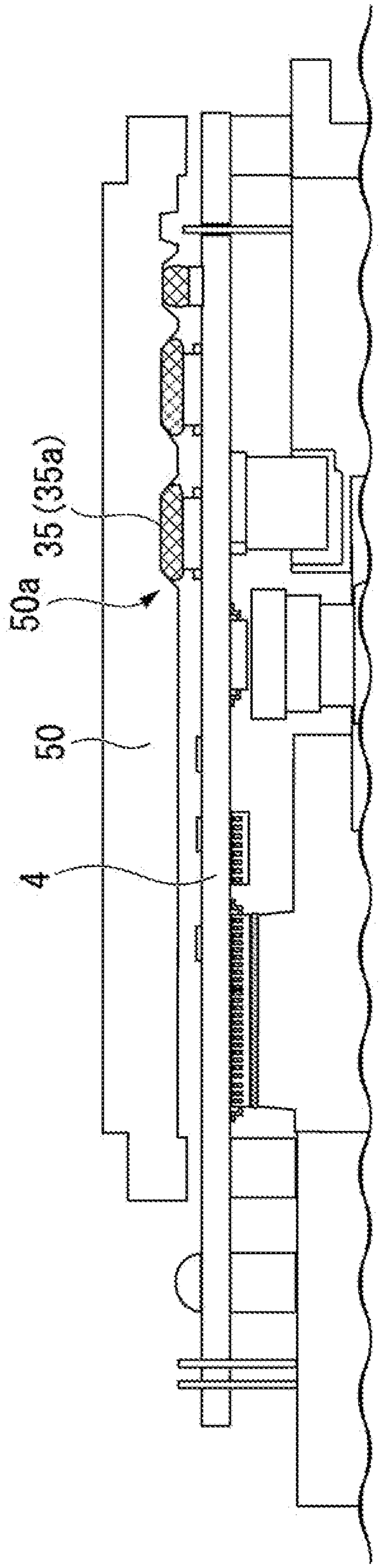
FIG. 3C is view of a heat sink assembly step (spreading out the heat dissipating material) according to the present embodiment.

Next, as shown in FIG. 3C the heat sink 50 is assembled so as to have a predetermined gap in between with the control board 4. At this time, the heat dissipating grease 35*a* is such that it spreads out in a radiative fashion along a shape of the recess 50*a* of the truncated cone of the heat sink 50. Here, if there is a gap between the heat dissipating grease 35*a* and the surface of the heat sink 50, the heat dissipation performance decreases. For this reason, so no gap forms between the heat dissipating grease 35*a* and the surface of the heat sink 50, a taper angle of a side of the recess 50*a* of the truncated cone is set according to a viscosity of the heat dissipating grease 35*a*. For example, with respect to a side surface of the heating element and the main surface 4*a* of the control board 4 of a vicinity of the heating element, the taper angle may be set anywhere from 30 degrees to 60 degrees. In this case, it is possible for the heat dissipating grease 35*a* to spread out along the surface of the heat sink 50. From this, it is possible to improve the heat dissipation performance, while optimizing an amount of the heat dissipating grease 35*a* used.

Figure 3D:
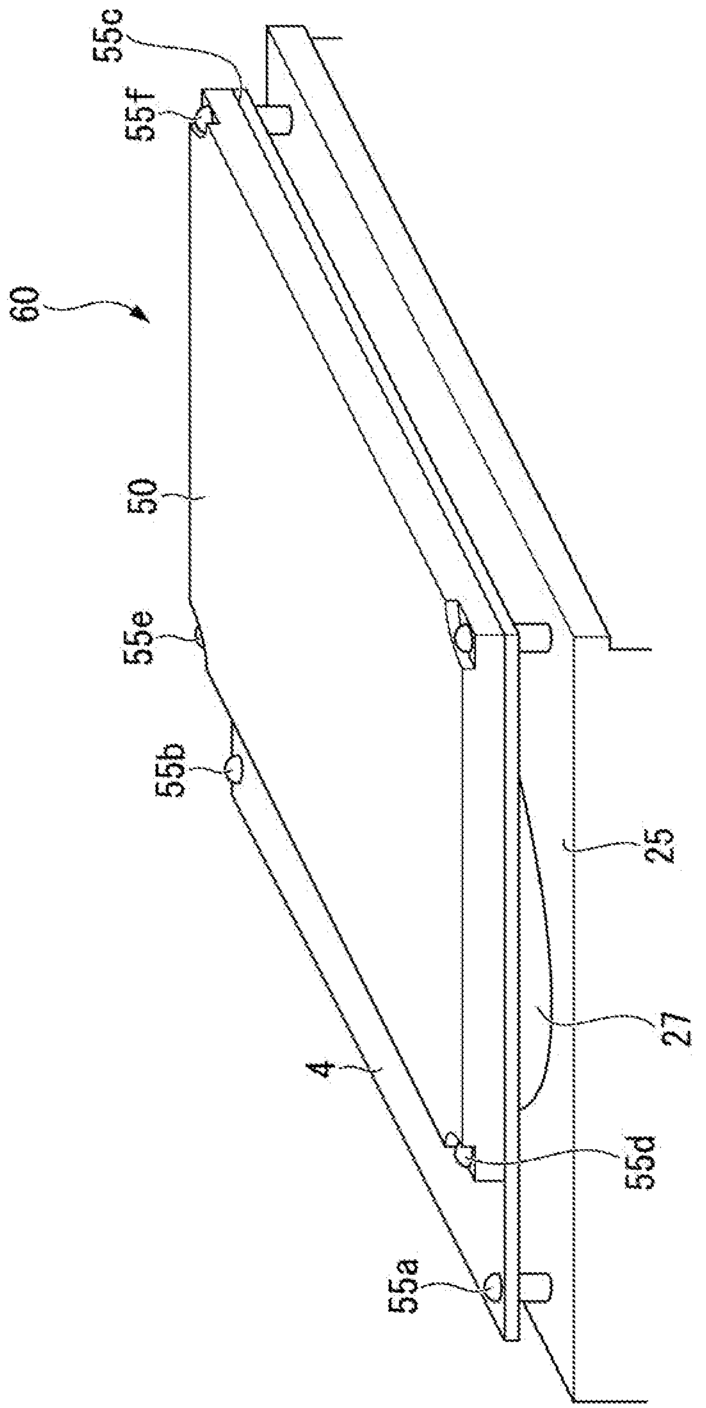
FIG. 3D is a view of a heat sink assembly step (screw-fixing) according to the present embodiment.

As a variation of the amount of the gap of a space between the heat sink 50 and the control board 4, and the space between the truncated cone 50*a* and the beating element become larger, the variation of the heat dissipation performance to the heat sink 50 of the heating element becomes larger. Here, as shown in FIG. 3D, in the present embodiment, in addition to a plurality of screws 55*a* to 55*c* or the like being appropriated to fix the control board 4 to the case 25 mentioned above, screws 55*d* to 55*f* are appropriated so as to fix the power circuit portion S2 to the control board 4. In other words, by also using the screws 55*d* to 55*f* to fix the heat sink 50 through the control board 4, it is possible to suppress the variation in the amount of the gap with high precision. From this, it is possible to stabilize the heat dissipation performance to the heat sink 50 of the heating element.

In addition, the embodiments mentioned above may be modified or omitted as deemed appropriate.

Henceforth, modification examples 1 to 3 of the embodiment mentioned above are described. Explanations of similar components to the components of the embodiments mentioned above are omitted.

First Modification Example

Figure 4:
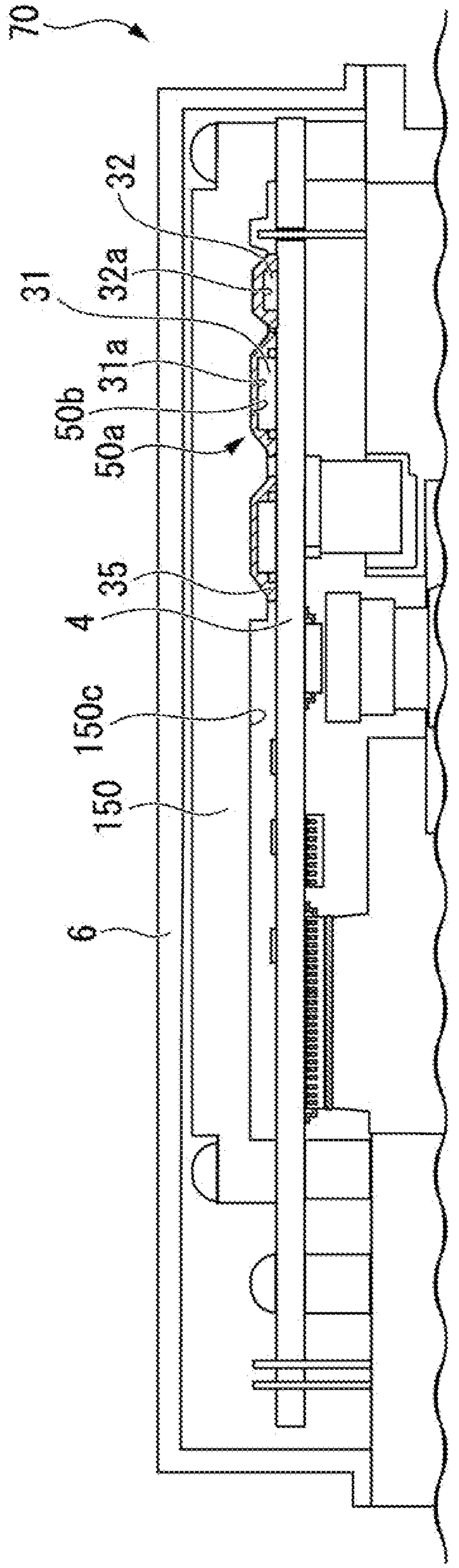
FIG. 4 is a cross-sectional view of the heat dissipating structure according to a first modification example.

In FIG. 4, a cross-sectional view of a modification example of the embodiment mentioned above which is a heat dissipating structure 70 is shown.

In modification example 1, a region of high temperature in the vicinity of the heating element of the control board 4 is a region where no electronic components are mounted. Specifically, a flat surface 150*c* where the recess 50*a* of the truncated cone of a heat sink 150 is not formed is set to be the region where no electronic components are mounted. Here, as in the embodiment mentioned above, a height is not changed so that it is possible to form the flat surface 150*c* to have the same height as a height of a flat surface 50*b* of the truncated cone. From this, it is possible to improve the heat dissipation performance to the heat sink 150 of the heating element, also, to suppress the amount of aluminum used.

Second Modification Example

Figure 5:
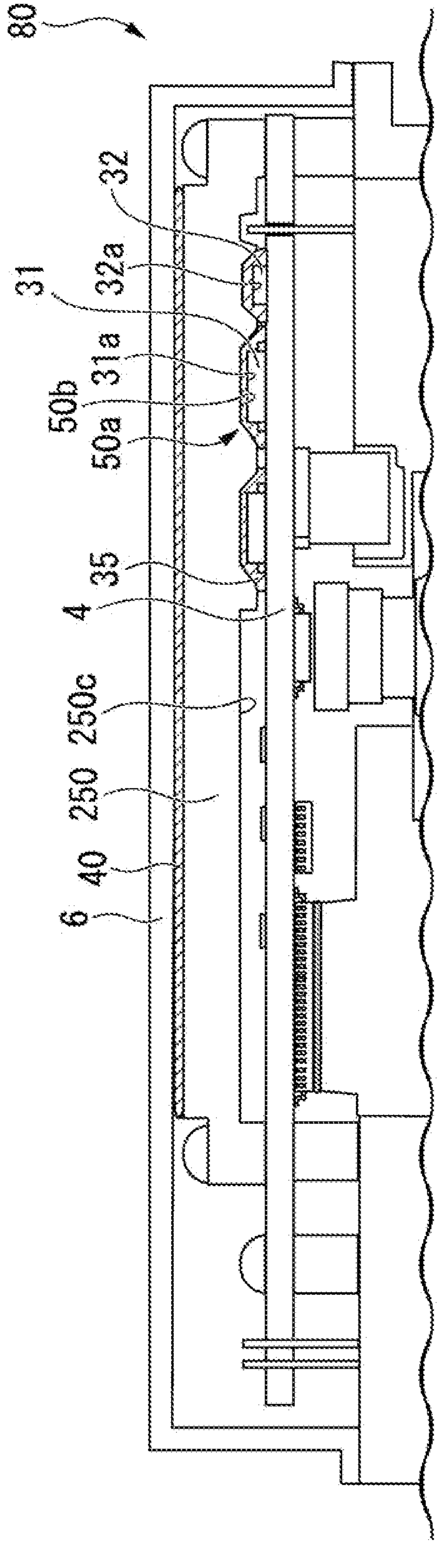
FIG. 5 is a cross-sectional view of the heat dissipating structure according to a second modification example.

In FIG. 5, a cross-sectional view of a modification example of the embodiment mentioned above which is a heat dissipating structure 80 is shown.

In modification example 2, the cover 6 is a part formed of a metal, for example aluminum, iron or the like, that has a high thermal conductivity. A heat dissipating material 40 is provided in a gap between a heat sink 250 and the cover 6.

In this case, it is possible to increase the heat dissipating surface from the heat sink 250 to the surrounding air. For this reason, even if the heat generation amount of the heating element increases, it is possible to suppress an increase in a thickness of the heat sink 250 which takes into account a temperature gradient of the heating element.

From this, for example, with respect to heat dissipation of the heating element, it is possible to form a path where heat is dissipated to an inside of the heat sink 250 from a heating element top surface and from a top side flat surface of a recess of the truncated cone, and a path where heat is dissipated to the inside of the heat sink 250 from a flat surface other than the truncated cone of the heat sink, where the heat spreads to a control board surface through the control board 4 having heating elements mounted. In other words, it is possible to increase heat dissipation paths while being able to plan an expansion of the heat dissipating surface of the heat sink 250. From this, it is possible to suppress the variation in distances of the gap, while further improving and stabilizing the heat dissipation performance of the rotating electrical machine.

Third Modification Example

Figure 6:
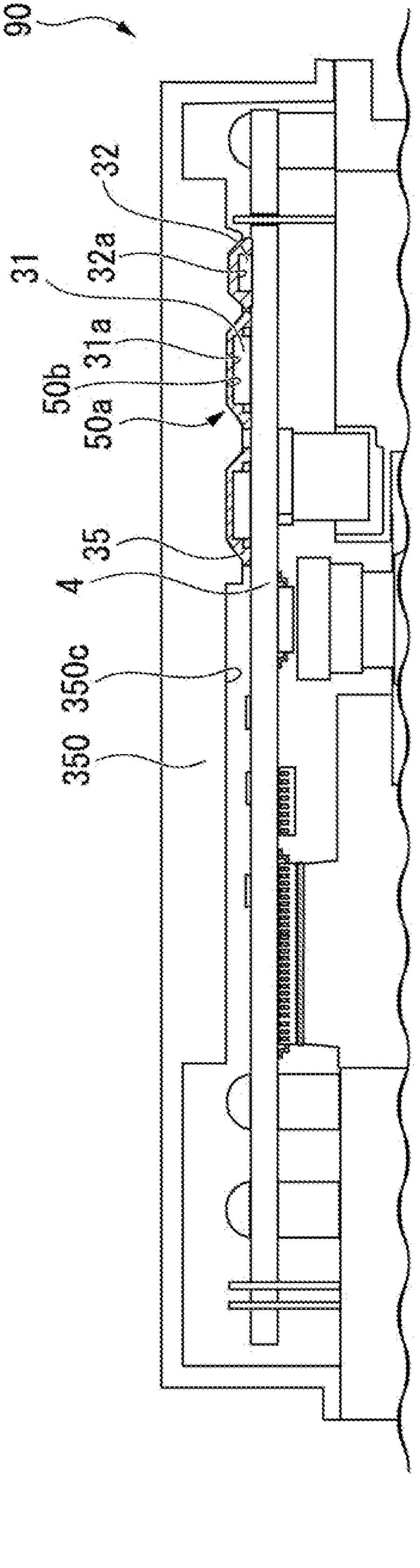
FIG. 6 is a cross-sectional view of the heat dissipating structure according to a third modification example.

In FIG. 6, a cross-sectional view of a modification example of the embodiment mentioned above which is a heat dissipating structure 90 is shown.

In modification example 3, the heat sink and the cover for example, both formed as separate components in the embodiments mentioned above, are integrally formed as heat sink 350. The heat sink 350 for example, is formed of aluminum die-cast or the like. From this, thermal conductivity from the heat sink to the outside is increased, and suppression of the thickness of the heat sink 50 is possible.

According to any one of the embodiments and the modification examples mentioned above, it is possible to expand the heat dissipating surface with respect to the heat sink of the heating element, especially the heat dissipating surface of a heating element top surface side. Therefore, it is possible to realize an improvement and stabilization of the heat dissipation performance to the heat sink, to suppress enlargement of the heat sink, and provide a high quality rotating electrical machine.

REFERENCE SIGNS LIST

1 . . . Control Unit
2 . . . Motor
4 . . . Control Board
4*a* . . . Main Surface
5 . . . Connector
6 . . . Cover
21 . . . Output (Rotation) Shaft
22 . . . Rotor
23 . . . Stator
24 . . . Winding
24*a*, 24*b* . . . Bobbin
25 . . . Case
26*a*, 26*b* . . . Bearing
27 . . . Housing
28 . . . Annular Terminal Portion
30 . . . CPU
31 . . . Switching Element (Heating Element)
32 . . . Shunt Resistor (Heating Element)
33 . . . Capacitor
34 . . . IC
35 . . . Heat Dissipating Material
50, 150, 250, 350 . . . Heat Sink
50*a* . . . Recess
60, 70, 80, 90 . . . Heat Dissipating Structure
100 . . . Rotating Electrical Machine

The invention claimed is:

1. A rotating electrical machine that includes a heat dissipating structure of a heat generating portion of a control board comprising:
- the control board that includes a heating element on top of a main surface;
- a heat sink disposed so as to oppose the main surface, and includes a recess that accommodates the heating element on an opposite surface that opposes the main surface;
- a heat dissipating material formed in a gap between the heating element and the recess; and
- a cover in which the control board and the heat sink are placed therein; wherein
- a second heat dissipating material is placed between the cover and the heat sink in an axial direction.

2. The rotating electrical machine according to claim 1, wherein:
- the recess includes a cross-sectional shape of a truncated cone; and
- a distance between a bottom surface of the truncated cone and a top surface of the heating element is greater than or equal to a distance between a region of the heat sink where the truncated cone is not formed on the surface opposite to the main surface of the control board and the main surface of the control board.

3. The rotating electrical machine according claim 1, wherein:
- a taper angle of the recess of the heat sink with respect to a side surface of the heating element and the main surface of the control board of the vicinity of the heating element is 30 degrees to 60 degrees.

4. The rotating electrical machine according to claim 3, further comprising:
- the cover having the control board and the heat sink therein, and
- the heat sink and the cover are configured integrally.

5. The rotating electrical machine according to claim 1, further comprising:
- the cover having the control board and the heat sink therein, and
- the heat sink and the cover are configured integrally.

6. A rotating electrical machine that includes a heat dissipating structure of a heat generating portion of a control board comprising:

the control board that includes a heating element on top of a main surface;

a heat sink disposed so as to oppose the main surface, and includes a recess that accommodates the heating element on an opposite surface that opposes the main surface;

a heat dissipating material formed in a gap between the heating element and the recess; and a case that accommodates a motor; wherein the heat sink is screw-fixed to the case through the control board.

* * * * *